Figure 1:
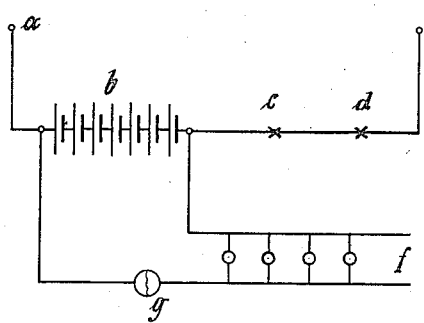

W. SCHAFFER.
CONNECTION FOR RUNNING ARC LAMPS.
APPLICATION FILED JAN. 13, 1910.

1,032,027.

Patented July 9, 1912.

Witnesses:
L. O. Badeau.
H. D. Penney.

By his Attorney,
F. H. Richards.

Inventor:
Walter Schäffer,

UNITED STATES PATENT OFFICE.

WALTER SCHÄFFER, OF BERLIN, GERMANY.

CONNECTION FOR RUNNING ARC-LAMPS.

1,032,027.

Specification of Letters Patent.

Patented July 9, 1912.

Application filed January 13, 1910. Serial No. 537,821.

*To all whom it may concern:*

Be it known that I, WALTER SCHÄFFER, engineer, a subject of the Emperor of Germany, residing at Geisbergstrasse 29, Berlin, Germany, have invented certain new and useful Improvements in or Relating to Connections for Running Arc-Lamps, of which the following is a specification.

My invention relates to connections for running arc lamps, in which the series resistance of the arc lamps is wholly or partially formed by incandescent lamps in series with regulating resistances, and the primary object is to provide a resistance wherein an electrolytic cell battery is connected in series with the arc lamps and also in parallel with the circuit containing one or more regulating resistances and incandescent lamps.

When it is desired to substitute the series resistances of the arc lamps entirely or partly by incandescent lamps, to avoid the waste of energy of a series resistance, provision must be made so that the arc lamps will be freely subjected to the necessary fluctuations of current or tension which occur in starting and completing their regulation, and at the same time to afford protection to the said incandescent lamps during the said fluctuations. This protection will be necessary when two arc lamps are connected in series, or where one arc lamp is used alone in 110 volt system, the latter being especially important in modern lighting plants. For the above noted protective purpose a resistance may be used, the value of which varies automatically with the current, and may be in the form of a regulating resistance such as iron wire resistances. These resistance regulators may be connected in series with the incandescent lamps, but cannot be merely connected together with the incandescent lamps in series with the arc lamps, because the arc lamps will be then deprived of the action of the fluctuations of current that are necessary for their regulation.

According to my invention I provide a special arrangement for supplying the arc lamps with the variations of current necessary for their regulation. This arrangement consists in connecting in series with the arc lamps an electrolytic cell battery connected in parallel in a circuit comprising the regulating resistances and incandescent lamps. When the lamps burn normally very little or no current flows through this battery. If impulses of current occur when the arc lamps regulate, the corresponding variations in current take place in the battery circuit and flow through the said battery circuit to the arc lamps without influencing the incandescent lamps.

In the accompanying drawings are diagrammatically shown embodiments of my device, in which—

Figure 2:
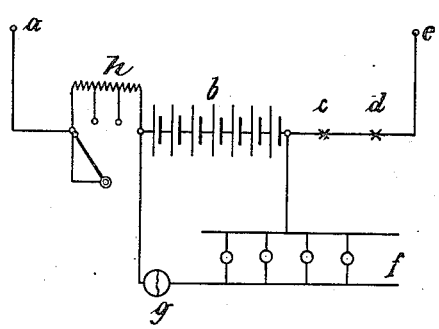
Figure 3:
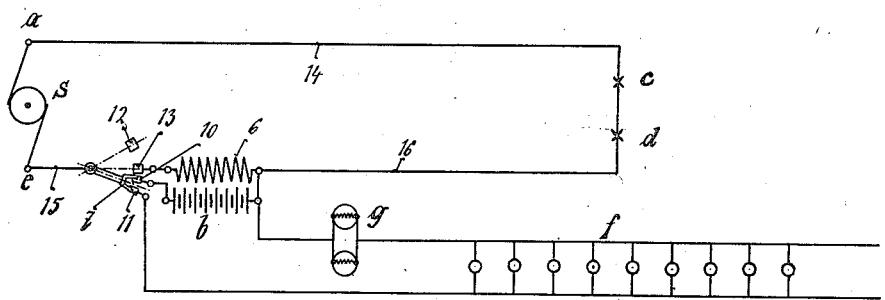
Figure 4:
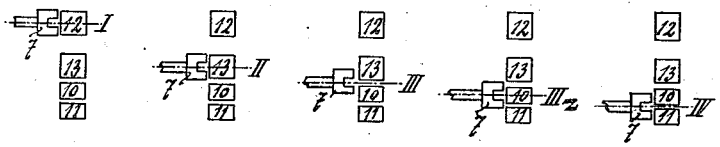

Figure 1 is one form of my device, Fig. 2 shows the same connected to a lighting plant, Fig. 3 is a modified arrangement, and Fig. 4 shows the various operating positions of the switch.

Referring to Fig. 1, $a$ and $e$ denote the terminals of a feeder system, $b$ designates a battery of electrolytic cells, $c$ and $d$ represent arc lamps, $f$ indicates an incandescent lamp circuit, and $g$ an iron wire resistance termed a regulating resistance. The battery and arc lamps are connected in series, and the incandescent lamp circuit is connected in series with the regulating resistance to the terminals of the battery. If the difference of potential between the terminals of the battery is 110 volts and if each arc lamp requires 40 volts, I employ a line having a counter-electromotive force of 30 volts, of about 8 to 12 cells, consisting of lead plates in dilute sulfuric acid.

If the internal resistance is sufficiently small, it follows that the tension at the terminals of the battery does not exceed, on the one hand, a certain amount which results from the maximum attainable counter-electromotive force increased by current multiplied by internal resistance, and that, on the other hand, from this maximum amount downward the electrolytic cell tension is exceedingly unstable. When changes occur in an arc an optionally strong current, limited by the cut-out of the system, can flow through the cells to the arc lamps and thus cause them to be regulated rapidly. The above holds good for starting the arc lamps after the carbons have contacted with one another for a moment and a strong current flows. The incandescent lamps connected in parallel with the battery are obviously not exposed to a current stronger than the normal.

Referring now to Fig. 2, a starting resistance $h$, having a switch lever $i$, causes the arc lamps to be slowly cut in, and is in series with the plant.

It sometimes happens that the plates of the battery of electrolytic cells, which preferably consist of lead plates and dilute sulfuric acid, become coated with a layer of sulfate when the battery has not been working for a long time. When cutting the battery into circuit this insulating sulfate layer must be destroyed, which operation occupies an exceedingly short time, usually less than a second, but nevertheless might cause trouble if the hereinbefore described connections were made at once when cutting in the battery. In such cases I employ the connection shown in Fig. 3. In this connection, the layer of sulfate is automatically broken down without the incandescent lamp circuit being affected by the increase of potential. I attain this end by providing an ordinary resistance and arranging the switch for the lighting plant in such a manner that before the final working connection is made, this resistance, in parallel with the electrolytic cell battery, is connected in series with the arc lamps. I also employ the resistance during the starting period of the arc lamps by connecting the resistance only in series with the arc lamps. By this method the strong current which flows when the lamps are started is prevented from becoming so great as to blow out the series fuses.

Fig. 3 diagrammatically shows an entire plant arranged after the above mode of connection, with the switch in its operative position, and Fig. 4 shows on an enlarged scale the individual positions of the switch when connecting the lamps into circuit. In these figures $a$ and $e$ designate the terminals of the source of current $s$, $c$ and $d$ arc lamps, 6 designates an ordinary starting resistance, $b$ an electrolytic cell battery comprising eight cells, $f$ incandescent lamps, and $g$ regulating resistances, instead of which I might obviously provide a single regulating resistance in series with each incandescent lamp or group of the same. The switch lever 7 has a forked contact, as clearly shown. When working normally the switch lever is positioned so that its contact is on the contacts 10 and 11 together. The current then flows from terminal $e$ by way of feeder 15 through switch lever 7, and there divides, the greater part of the current flowing from contact 11 by way of the incandescent lamps $f$ and resistances $g$ to the lamp conductor 16, and the smaller portion of the current flowing by way of contact 10, battery 3, conductor 16, arc lamps $d$ and $c$, and feeder 14 to terminal $a$.

The arrangement is such that when cutting the lamps into circuit, the above mentioned events occur as shown by the individual positions of the switch lever in Fig. 4. In the cut-out position the forked contact of the switch lever is on the rest contact 12 of the switch, corresponding to position I in Fig. 4. For starting, the contact is placed on contact 13, as shown in position II; the electrolytic cell battery and the incandescent lamps $f$, together with the regulating resistances $g$, are not in circuit. The current flowing, when the arc lamps start, passes through the standard starting resistance 6. In position III the switch lever 7 connects contacts 10 and 13. Battery $b$ is then connected in parallel with resistance 6. In the event of the lead plates having become sulfated, the layer of sulfate is removed, or at least diminished, by the current which flows through it. On the other hand, in position III the battery has time to obtain a corresponding counter-electromotive force. The switch lever is then shifted to position IV. In this position the forked contact of lever 7 connects contacts 10 and 11 and the battery is then in parallel connection with the incandescent lamp circuit, the same being in series with the arc lamps. The illustration III shows the intermediate position of lever 7 between positions III and IV. The forked contact of the lever should be so broad that it just leaves contact 13 as it engages with contact 11, so that any possible engagement of contacts 13, 10 and 11 can only exist for a very short period of time during the movement of the switch lever. Thus the forked contact never remains on contact 10 alone, but always on contacts 10 and 13 or on contacts 10 and 11. For cutting the plant out of circuit the switch lever 7 must be returned so that its forked contact is again on the rest contact 12. In this position the battery $b$ is not connected with either the incandescent lamp circuit or the series resistance, but is cut out of circuit entirely. Therefore, it maintains for a long time its electromotive force, which, as is well known, opposes the formation of sulfate.

I preferably make switch lever 7 so that in the positions I, II, III and IV it snaps into place under the action of a spring, so that these positions are readily found and the lever does not remain on the intermediate positions. When being switched from contact 13 to contact 12 the motion of the switch lever is also accelerated by the force of the spring so that the contact of lever 7 is prevented from remaining a short distance away from contact 13, thereby making it impossible for an arc to be maintained between contacts 13 and 7.

Instead of connecting all the incandescent lamps in series with one and the same resistance regulator, I may employ a plurality of the latter connected in series or parallel, or individually in series with incandescent lamps. Two regulating resistances are shown connected in parallel in Fig. 3 by way of example.

I claim:—

1. An electric lighting system for the running of arc lamps, in which the reducing rheostat of the arc lamp is formed by incandescent lamps in series with a resistance regulator, and has a battery of electrolytic cells connected into the circuit in series with the arc lamps and in parallel connection with the circuit containing the said resistance regulating means and the incandescent lamps.

2. In an electric lighting system of the character described, the combination with feeders and arc lamps in series therewith, of a circuit comprising one or more resistance regulators and a group of incandescent lamps in series therewith normally interpolated in one of said feeders in series with said arc lamps, and a battery of electrolytic cells normally connected in parallel with said circuit and in series with said arc lamps, a starting resistance electrically connected with said arc lamps, said battery and said circuit, and a switch connected to one of said feeders for connecting solely said resistance in series with the arc lamps and subsequently connecting the same in parallel with and disconnecting the same from said battery.

3. In an electric lighting system of the character described, the combination of a feeder, a switch lever connected therewith, a rest contact and three operative contacts (13, 10, 11) adapted to be contacted by said lever, an arc lamp line, a resistance connected between the latter and the first operative contact (13), an incandescent lamp circuit comprising one or more resistance regulators in series with incandescent lamps connected with said line and the third operative contact (11), electrolytic cells connected with the second operative contact (10) and with said line, the arrangement of said operative contacts being such that when the switch lever contacts with the second operative contact one of the other operative contacts is always simultaneously contacted thereby.

In testimony whereof I have signed my name to this specification in the preesnce of two witnesses.

WALTER SCHÄFFER.

Witnesses:
WOLDEMAR HAUPT,
HENRY HASPER.